(12) United States Patent
Judd et al.

(10) Patent No.: US 11,373,039 B2
(45) Date of Patent: Jun. 28, 2022

(54) CONTENT CONTEXT AWARE MESSAGE INTENT CHECKER

(71) Applicant: International Business Machines Corporation, Armonk, NY (US)

(72) Inventors: Ross Warren Judd, Beacon Hill (AU); Sumit Patel, Scottsdale, AZ (US); Thomas Edward Creamer, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/583,379

(22) Filed: Sep. 26, 2019

(65) Prior Publication Data

US 2021/0097137 A1 Apr. 1, 2021

(51) Int. Cl.
*G06F 40/232* (2020.01)
*H04L 51/063* (2022.01)
*G06F 40/30* (2020.01)
*G06F 40/295* (2020.01)
*G06V 10/40* (2022.01)
*H04L 51/222* (2022.01)
*G06V 30/10* (2022.01)

(52) U.S. Cl.
CPC .......... *G06F 40/232* (2020.01); *G06F 40/295* (2020.01); *G06F 40/30* (2020.01); *G06V 10/40* (2022.01); *H04L 51/063* (2013.01); *H04L 51/222* (2022.05); *G06V 30/10* (2022.01)

(58) Field of Classification Search
None
See application file for complete search history.

(56) References Cited

U.S. PATENT DOCUMENTS

| 8,903,716 | B2 | 12/2014 | Chen et al. | |
| 9,166,823 | B2 | 10/2015 | Karmarkar | |
| 2005/0176366 | A1* | 8/2005 | Levy | H04M 3/4938 455/3.06 |
| 2007/0250716 | A1* | 10/2007 | Brunk | H04K 1/00 713/176 |
| 2009/0228583 | A1* | 9/2009 | Pocklington | H04L 51/00 709/224 |
| 2010/0255865 | A1* | 10/2010 | Karmarkar | H04W 4/029 455/466 |
| 2012/0254744 | A1 | 10/2012 | Kay et al. | |

(Continued)

OTHER PUBLICATIONS

Balke, Stefan, Sanu Pulimootil Achankunju, and Meinard Muller. "Matching musical themes based on noisy OCR and OMR input." In 2015 IEEE International Conference on Acoustics, Speech and Signal Processing (ICASSP), pp. 703-707. IEEE, 2015. (Year: 2015).*

(Continued)

*Primary Examiner* — Frank D Mills
(74) *Attorney, Agent, or Firm* — Sonny Z. Zhan

(57) ABSTRACT

In an approach for providing an enhancement to message check capabilities through an awareness of the message content, a processor processes a message that includes a non-textual part and a textual part. A processor identifies a content context of the non-textual part of the message. A processor identifies an intent and entity of the textual part of the message. A processor determines a potential mismatch between the content context of the non-textual part and the intent and entity of the textual part. A processor provides a suggested replacement for the potential mismatch.

20 Claims, 5 Drawing Sheets

(56) References Cited

U.S. PATENT DOCUMENTS

| | | | | |
|---|---|---|---|---|
| 2013/0232205 | A1* | 9/2013 | Gorecha | G06Q 10/10 |
| | | | | 709/206 |
| 2014/0164506 | A1* | 6/2014 | Tesch | H04L 51/32 |
| | | | | 709/204 |
| 2014/0164507 | A1* | 6/2014 | Tesch | H04L 51/10 |
| | | | | 709/204 |
| 2016/0062984 | A1* | 3/2016 | Caliendo, Jr | G06F 3/0488 |
| | | | | 704/9 |
| 2016/0103813 | A1 | 4/2016 | Liensberger | |
| 2016/0110327 | A1 | 4/2016 | Knox | |
| 2017/0083506 | A1* | 3/2017 | Liu | G06F 40/166 |
| 2017/0093787 | A1* | 3/2017 | Harihara Iyer | H04L 51/36 |
| 2018/0004371 | A1* | 1/2018 | Han | G06F 3/0485 |
| 2018/0062878 | A1 | 3/2018 | Davies et al. | |
| 2018/0278561 | A1* | 9/2018 | Carnevale | H04L 51/12 |
| 2020/0110805 | A1* | 4/2020 | Beaver | G06F 3/04817 |

OTHER PUBLICATIONS

"Context (language use)", From Wikipedia, The Free Encyclopedia, Last Edited May 15, 2019, 2 pages, <https://en.wikipedia.org/wiki/Context_(language_use)>.

"Emojipedia FAQ", Printed Sep. 10, 2019, 7 pages, <https://emojipedia.org/faq/#how-many>.

Disclosed Anonymously, "Contact-aware spell checker", An IP.com Prior Art Database Technical Disclosure, IP.com No. IPCOM000252871D, Published Feb. 16, 2018, 4 pags.

IBM et al., "Spelling Correction with Keyboard, User, and Language Models", An IP.com Prior Art Database Technical Disclosure, IP.com No. IPCOM000104425D, Published Apr. 1, 1993, 7 pages.

IBM et al., "Using Keypress Chronology to Spell-Correct Words with Transposed Charaters", An IP.com Prior Art Database Technical Disclosure, IP.com No. IPCOM000113095D, Published Jul. 1, 1994, 7 pages.

IBM, "Intelligent Keyboard Interface", An IP.com Prior Art Database Technical Disclosure, IP.com No. IPCOM000179514D, Published Feb. 16, 2009, 3 pages.

Wang et al., "Context-Aware Intent Identification in Email Conversations", Proceedings of the 42nd International ACM SIGIR Conference on Research and Development in Information Retrieval (SIGIR '19), Jul. 21-25, 2019, Paris, France, 10 pages. <https://www.microsoft.com/en-us/research/uploads/prod/2019/05/Wang_SIGIR19.pdf>.

Mell et al., "The NIST Definition of Cloud Computing", Recommendations of the National Institute of Standards and Technology, Special Publication 800-145, Sep. 2011, 7 pages.

* cited by examiner

CONTENT CONTEXT AWARE MESSAGE INTENT CHECKER

BACKGROUND

The present disclosure relates generally to the field of messaging, and more particularly to contextual awareness and checking of message content.

In software, a spell checker (or spell check) is a software feature that checks for misspellings in a text. Spell check features are often in software, such as a word processor, email client, electronic dictionary, or search engine. A spell checker may scan the text and extract the words contained in the text. The spell checker may then compare each word with a known list of correctly spelled words (i.e., a dictionary). The list might contain a list of words, and might contain additional information, such as hyphenation points or lexical and grammatical attributes. The spell checker may need to consider different forms of the same word, such as plurals, verbal forms, contractions, and possessives.

SUMMARY

Aspects of an embodiment of the present disclosure disclose an approach for providing an enhancement to message check capabilities through an awareness of the message content. A processor processes a message that includes a non-textual part and a textual part. A processor identifies a content context of the non-textual part of the message. A processor identifies an intent and entity of the textual part of the message. A processor determines a potential mismatch between the content context of the non-textual part and the intent and entity of the textual part. A processor provides a suggested replacement for the potential mismatch.

DETAILED DESCRIPTION

The present disclosure is directed to systems and methods for providing an enhancement to message check capabilities through an awareness of the message content.

Spelling and grammar checkers have been available for many years to correct mistakes or suggest alternatives. Spell checkers traditionally work by comparing the entered word against a list of known words or using letter substitution until a valid word is found. Grammar checkers attempt to verify written text for grammatical correctness based on the rules of a given language. The present disclosure recognizes there are numerous scenarios where spelling and grammar checkers do not result in a better outcome or where there are more detailed scenarios which are missed. In many situations, an understanding of context is important in improving the decision-making process. The present disclosure recognizes that there are a number of types of context which are important to the activity of improving a message intent. A progression of context usage is provided to ensure the message meaning meets the intent of the author.

The present disclosure discloses that a system utilizes contextual items such as (i) keyboards, (ii) specific device features including languages, application settings, punctuation and special character use habits, emoji or image use, (iii) an awareness of a recipient, or other non-textual content, into account when performing a spellcheck and recommendation to increase the potential of finding a correct result.

The present disclosure discloses that a system provides an enhancement to spelling and grammar checking capabilities through an awareness of the message content and not just text. In an example, the system may utilize an awareness of the user device's context including, but not limited to, text, spoken words, location settings, keyboard settings, global positioning system(s), microphone(s), camera(s), accelerometer(s), and thermometer(s). In another example, the system may utilize an awareness of the message content including, but not limited to text, image(s), emoji(s), audio, location(s), and video(s).

In one embodiment, the system checks that the meaning of an emoji matches the context of a user message and highlights any discrepancy. In another embodiment, the system checks that an attachment of a user message matches the context of a user message and highlights any discrepancy. The attachment may be an image or audio file but is not limited to an image or audio file. In another embodiment, the system checks that a specific location or about an event matches the context of a user message and highlights any discrepancy.

Figure 1:
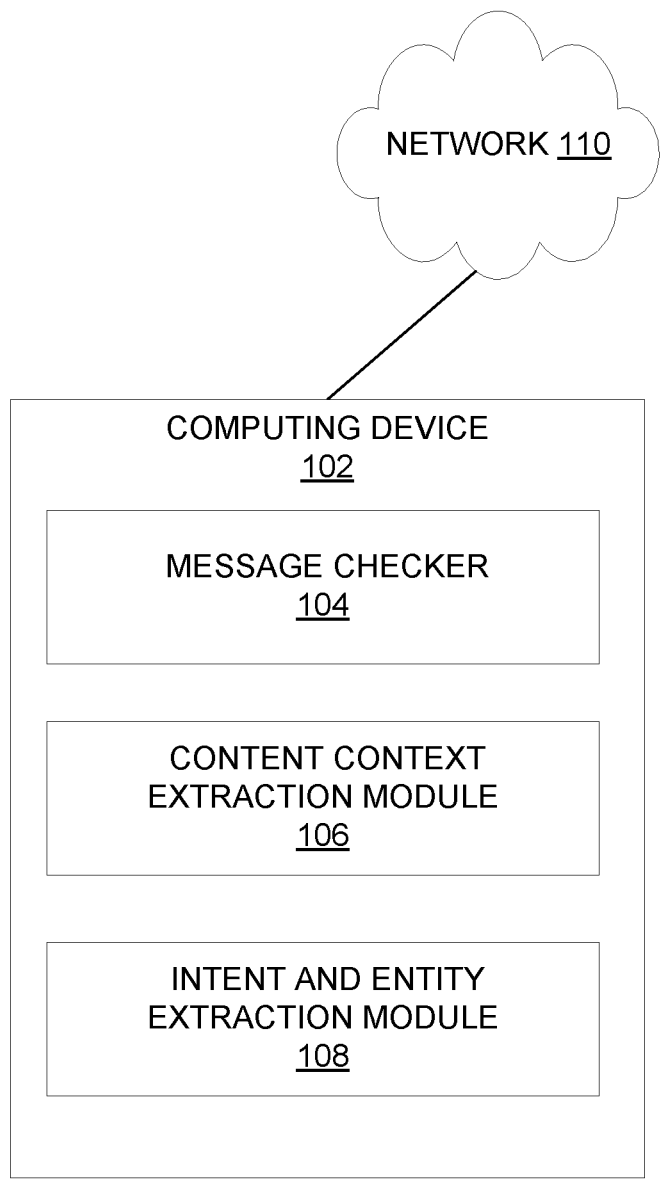
FIG. 1 is a functional block diagram illustrating a content context aware message intent check environment, in accordance with an embodiment of the present disclosure.

The present disclosure will now be described in detail with reference to the Figures. FIG. 1 is a functional block diagram illustrating a content context aware message intent check environment, generally designated 100, in accordance with an embodiment of the present disclosure.

In the depicted embodiment, content context aware message intent check environment 100 includes computing device 102 and network 110.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to message checker 104, content context extraction module 106, intent and entity extraction module 108, and network 110 and is capable of processing program instructions and executing message checker 104, content context extraction module 106, intent and entity extraction module 108, in accordance with an embodiment of the present disclosure. Computing device 102 may include internal and external hardware components, as depicted and described in further detail with respect to FIG. 3.

Further, in the depicted embodiment, computing device 102 includes message checker 104, content context extraction module 106, and intent and entity extraction module 108. In the depicted embodiment, message checker 104, content context extraction module 106, and intent and entity extraction module 108 are located on computing device 102. However, in other embodiments, message checker 104, content context extraction module 106, and intent and entity extraction module 108 may be located externally and accessed through a communication network such as network 110. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and message checker 104, content context extraction module 106, and intent and entity extraction module 108, in accordance with a desired embodiment of the disclosure.

Message checker 104 is configured to process a message entered by a user to a device, for example computing device 102. In some examples, the device can be a smartphone or any other input devices that the user can use to enter the message. The message may include a non-textual part and a textual part. In an example, the non-textual part of the message may include images, emojis, audio files, location documents, videos or other suitable attachments of the message. In another example, the non-textual part of the message may include the device context including, but not limited to, spoken words, location settings, keyboard settings, global positioning system information, microphone information, camera information, accelerometer information, and temperature information. In another example, the non-textual part of the message may include contacts and social media profile(s) associated with the user in the device. The textual part may just include the text of the message.

Content context extraction module 106 is configured to identify content contexts of the non-textual part of the message. In one or more embodiments, the non-textual part may include an image. Content context extraction module 106 may identify the content context of the image using image recognition techniques. Image recognition, in the context of machine vision, is generally the ability of software to identify objects, places, people, writing and actions in images. For example, if there is a dog in the image, content context extraction module 106 may recognize the dog in the image and identify the content context of the image as a dog. In one or more embodiments, the non-textual part may include an emoji. Content context extraction module 106 may identify the content context of the emoji. For example, if the emoji is a hamburger emoji, content context extraction module 106 may identify the content context and various entities within the emoji as a hamburger. In one or more embodiments, the non-textual part may include an audio file, for example, a music or song. Content context extraction module 106 may identify the content context of the music, such as the author or identification of the music, by, for example, analyzing the melody of the music.

In one or more embodiments, the non-textual part may include information of a location where computing device 102 is at, a business is located, and or an event is to happen. Content context extraction module 106 may identify the location information from computing device 102 based on the business or event name. In one or more embodiments, the non-textual part may include contact information associated with the user. In an example, the contact information is from one or more contact profiles of the user. In another example, the contact information is from one or more social media profiles of the user. Content context extraction module 106 may identify the contact information of the user based on the device that the users enters the message. The user can disable this feature, or have to opt in, to have their contact or personal information be obtained.

In one or more embodiments, the non-textual part may include any combination of images, emojis, audio files, location documents, videos, spoken words, location settings, keyboard settings, global positioning system information, microphone information, camera information, accelerometer information, temperature information, user contact profiles, and other suitable attachments, device contexts, and recipient contexts. Content context extraction module 106 may identify content contexts including entities of each component or combination of the components in the non-textual part of the message.

Intent and entity extraction module 108 is configured to identify the intents and entities of the textual part of the message. In general, the textual part is the text of the message. An intent may represent, for example, the purpose of the user who writes the message. An entity may represent, for example, a term or object that is relevant to the user's intent and that provides a specific context for the intent. Intent and entity extraction module 108 may apply a natural language processing technique to identify the intents and entities of the textual part. A natural language processing technique may include natural language classifying, natural language understanding, optical character recognition, and any other natural language processing techniques with analyzing, understanding, and generating natural human languages to interface with a machine, for example, computing device 102.

Message checker 104 is configured to perform an analysis based on the content contexts of the non-textual part and the intents and entities of the textual part to identify any potential mismatch. In one or more embodiments, the non-textual part may include an image. Content context extraction module 106 may identify the content context of the image using image recognition techniques. Intent and entity extraction module 108 may apply a natural language processing technique to identify the intents and entities of the textual part of the message. For example, when there is a dog in the image, content context extraction module 106 may recognize the dog in the image and identify the content context of the image as a dog. In this example, when the user types "we love our new cat", intent and entity extraction module 108 can identify the intents and entities of the textual part of the message meaning a cat. Message checker 104 performs the analysis and identifies a mismatch between the image with a dog and the message typed by the user. Message checker 104 can flag the image and the message. Message checker 104 can provide a corrective suggestion for the word "cat" with the word "dog". Message checker 104 can also provide a suggestion for the user, for example, to check whether the attachment of the image is a correct one.

In one or more embodiments, the non-textual part may include an emoji. Content context extraction module 106 may identify the content context of the emoji. For example, when the emoji is an emoji of a hamburger, content context extraction module 106 may identify the content context of the emoji as a hamburger. In this example, when the user types "getting pizza for dinner" in the device, intent and entity extraction module 108 can apply a natural language processing technique and identify the intents and entities of the textual part of the message meaning "getting a pizza". Message checker 104 performs the analysis and identifies a mismatch between the hamburger emoji and the message typed by the user meaning a pizza. Message checker 104 can flag the emoji and the message. Message checker 104 can provide a corrective suggestion for the hamburger emoji with a pizza emoji. Message checker 104 can also provide a suggestion for the user, for example, to check whether the word "pizza" should be "hamburger".

In one or more embodiments, the non-textual part may include an audio file, for example, a music or song. Content context extraction module 106 may identify the content context of the music, such as the author or identification of the music. For example, when the user is trying to write a message telling a friend that the user really likes a song named "Great Song" by Bob Smith and attaching a song, the user types "I really like 'Great Song" by Bob Smith. However, the user attaches the song "Happy Day" by John Doe. Content context extraction module 106 can identify the content context of the attached audio file as the song "Happy Day" by John Doe. Intent and entity extraction module 108 may identify the intents and entities of the textual part of the message meaning the song named "Great Song" by Bob Smith. Message checker 104 performs the analysis and identifies a mismatch between "Happy Day" by John Doe in the attached audio file and "Great Song'" by Bob Smith in the typed message. Message checker 104 can flag the attached audio file and the message. Message checker 104 can provide a suggestion for the user to replace the song "Happy Day" by John Doe with the song "Great Song" by Bob Smith. Message checker 104 can also provide a suggestion for the user, for example, to check whether the words "'Great Song' by Bob Smith" should be "'Happy Day' by John Doe".

In one or more embodiments, the non-textual part may include information of a location where a device that the user uses to enter a message is located. In an example, the device is computing device 102 or other suitable devices. Content context extraction module 106 may identify the location information from the device based on a global positioning system or other suitable positioning systems or applications. In an example, when a user is trying to write a message explain to a friend where the user is having a dinner, the user types "getting a quick snack at 'Fast Food'". The user with the device is actually at "Quick Restaurant." Content context extraction module 106 can identify the location of "Quick Restaurant" where the user with the device is. Intent and entity extraction module 108 identifies the intents and entities of the textual part of the message meaning the location "Fast Food." Message checker 104 performs the analysis and identifies a mismatch of the location information between "Quick Restaurant" and "Fast Food" in the typed message. Message checker 104 can flag the message indicating the location named "Fast Food" incorrectly. In another example, the user using the device types "getting a quick snack at 'Quick Restaurant' in the 'city south'". The user is actually at "Quick Restaurant" in the "city north." Context extraction module 106 can identify the location of "Quick Restaurant" which is in the "city north." Intent and entity extraction module 108 can identify the intents and entities of the textual part of the message meaning the location in the "city south." Message checker 104 can perform the analysis, identify a mismatch of the location information, and can flag the message indicating that the location message should be written "'Quick Restaurant' in the 'city north.'"

In one or more embodiments, the non-textual part may include contact information associated with the user. In an example, the contact information is from contact profiles of the user. In another example, the contact information is from social media profiles of the user. Content context extraction module 106 may identify the contact information of the user based on the device that the user enters the message. Message checker 104 may enable the utilization of the local contact list to perform a spell check on proper names and suggest an alternative. The user can disable this feature or have to opt in to have their contact or personal information be obtained. In an example, the user is typing the name of a colleague "John Cream," however, the user inadvertently misspells it as "Joe Cream". Message checker 104 may recognize the context of "John Cream," identify a mismatch and suggest an alternative based on the contact list of the user. The identification of the misspelling may be based on the context from the contact list of the user.

In one or more embodiments, the non-textual part may include any combination of images, emojis, audio files, location information, videos, spoken words, location settings, keyboard settings, global positioning system information, microphone information, camera information, accelerometer information, temperature information, user contact profiles, and other suitable attachments, device contexts, and recipient contexts. Content context extraction module 106 may identify content context of each component or combination of the components in the non-textual part(s) of the message. Intent and entity extraction module 108 may identify intents and entities of the textual part of the message. Message checker 104 may perform an analysis based on the content contexts of the non-textual part(s) and the intents and entities of the textual part(s) to identify any potential mismatch. Message checker 104 may provide suggestions for the potential mismatches. For example, message checker 104 may highlight the mismatched messages. Message checker 104 may suggest alternatives or corrections for the mismatched message elements.

Figure 2:
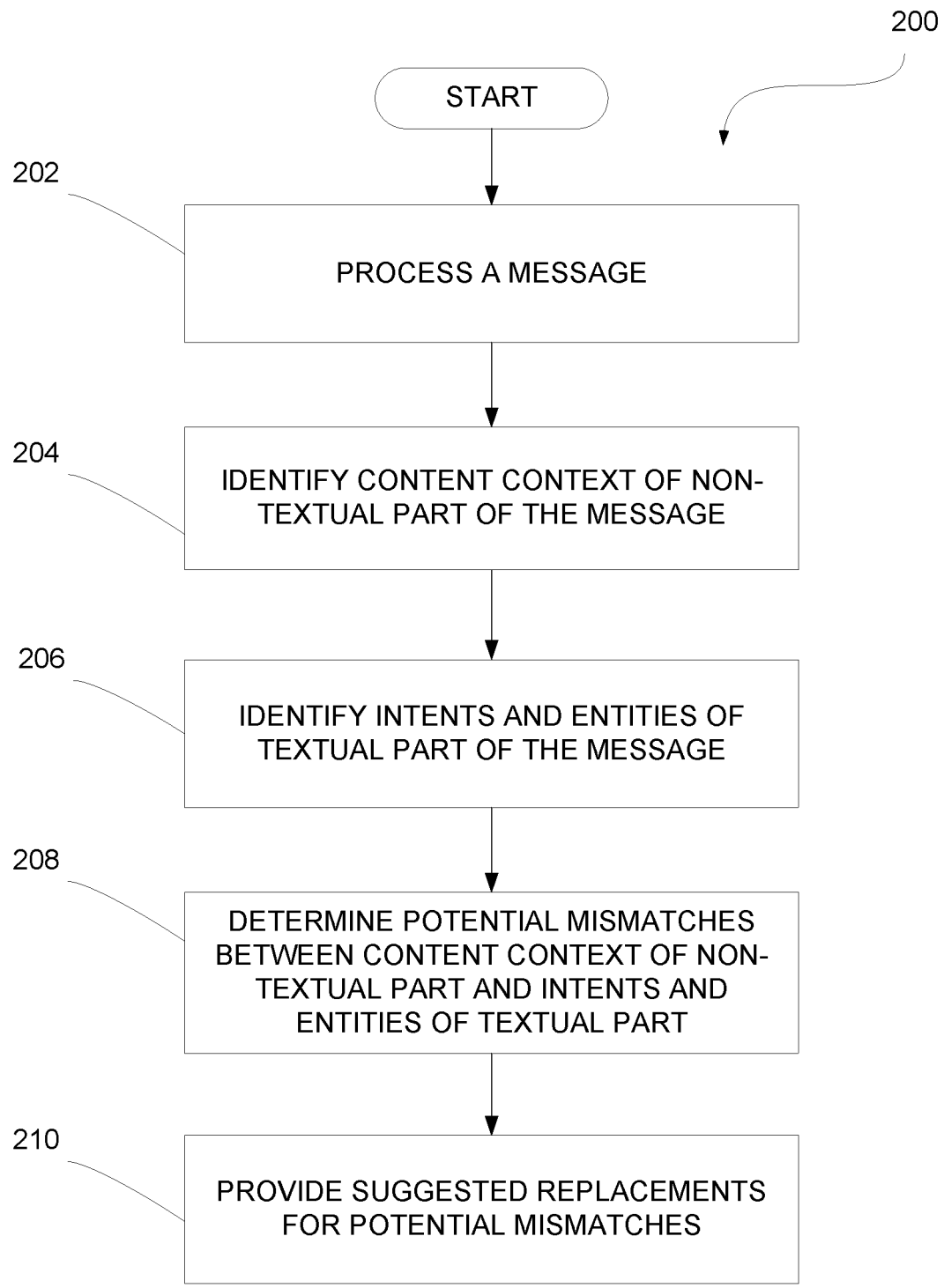
FIG. 2 is a flowchart depicting operational steps of a message checker within a computing device of FIG. 1, in accordance with an embodiment of the present disclosure.

FIG. 2 is a flowchart 200 depicting operational steps of message checker 104 within computing device 102 in accordance with an embodiment of the present disclosure.

Message checker 104 operates to process a message that includes at least one non-textual part and a textual part. Message checker 104 also operates to identify content contexts of the non-textual part of the message by content context extraction module 106. Message checker 104 operates to identify intents and entities of the textual part of the message by intent and entity extraction module 108. Message checker 104 operates to perform an analysis based on the content contexts of the non-textual part and the intents and entities of the textual part to identify potential mismatches. Message checker 104 operates to provide suggestions for the potential mismatches.

In step 202, message checker 104 processes a message that includes a non-textual part and a textual part. The message may be entered by a user to a device, for example computing device 102. In some examples, the device can be a smartphone or any other input devices that the user can use to enter the message. In an example, the non-textual part of the message may include images, emojis, audio files, location documents, videos, or other suitable attachments of the message. In another example, the non-textual part of the message may include the device context including but not limited to spoken words, location settings, keyboard settings, global positioning system information, microphone information, camera information, accelerometer information, and temperature information. In another example, the non-textual part of the message may include contacts and social media profiles associated with the user in computing device 102. The textual part may just include text of the message.

In step 204, message checker 104 identifies content contexts of the non-textual part of the message by content context extraction module 106. In one or more embodiments, the non-textual part may include an image. Content context extraction module 106 may identify the content context of the image using image recognition techniques. Image recognition, in the context of machine vision, is generally the ability of software to identify objects, places, people, writing and actions in images. For example, if there is a dog in the image, content context extraction module 106 may recognize the dog in the image and identify the content context of the image as a dog. In one or more embodiments, the non-textual part may include an emoji. Content context extraction module 106 may identify the content context of the emoji. For example, if the emoji is a hamburger emoji, content context extraction module 106 may identify the content context of the emoji as a hamburger. In one or more embodiments, the non-textual part may include an audio file, for example, a music file. Content context extraction module 106 may identify the content context of the music, such as the author or identification of the music, by, for example, analyzing the melody of the music.

In one or more embodiments, the non-textual part of the message may include information of a location where computing device 102 is, a business is located, or an event is to happen. Content context extraction module 106 may identify the location information from computing device 102 based on the business or event name. In one or more embodiments, the non-textual part may include contact information associated with the user. In an example, the contact information is from contact profiles of the user. In another example, the contact information is from social media profile(s) of the user. Content context extraction module 106 may identify the contact information of the user based on the device that the user enters the message. The user can disable this feature, or have to opt in, to have their contact or personal information be obtained.

In one or more embodiments, the non-textual part of the message may include any combination of images, emojis, audio files, locations, videos, spoken words, location settings, keyboard settings, global positioning system information, microphone information, camera information, accelerometer information, temperature information, user contact profiles, and other suitable attachments, device contexts, recipient contexts. Content context extraction module 106 may identify the content contexts of each component or combination of the components in the non-textual part of the message.

In step 206, message checker 104 identifies identify intents and entities of the textual part of the message by intent and entity extraction module 108. In general, the textual part is the text of the message. An intent may represent, for example, the purpose of the message as intended by the user who writes the message. An entity may represent, for example, a term or object that is relevant to the user's intent and that provides a specific context for the intent. Intent and entity extraction module 108 may apply a natural language processing technique to identify the intents and entities of the textual part. A natural language processing technique may include natural language classifying, natural language understanding, optical character recognition, and any other natural language processing techniques with analyzing, understanding, and generating natural human languages to interface with a machine, for example, computing device 102.

In step 208, message checker 104 performs an analysis based on the content contexts of the non-textual part of the message and the intents and entities of the textual part of the message to identify potential mismatches. Message checker 104 determines potential mismatches between the content context of the non-textual part of the message and the intents and entities of the textual part of the message. For example, message checker 104 may identify the potential mismatches by comparing the meaning of the content contexts of the non-textual part to the meaning of the intents and entities of the textual part. Message checker 104 may identify the potential mismatches by identifying the noun from the textual part and comparing that noun to a noun extracted from the content contexts of the non-textual part. In one or more embodiments, the non-textual part may include an image. Content context extraction module 106 may identify the content context of the image using image recognition techniques. Intent and entity extraction module 108 may apply a natural language processing technique to identify the intents and entities of the textual part of the message. For example, when there is a dog in the image, content context extraction module 106 may recognize the dog in the image and identify the content context of the image as a dog. In this example, when the user types "we love our new cat", intent and entity extraction module 108 can identify the intent and entity of the textual part of the message meaning a cat. Message checker 104 performs the analysis and identifies a mismatch between the image with a dog and the message typed by the user. In step 210, message checker 104 can flag the image and the message. Message checker 104 can provide a corrective suggestion for the word "cat" with the word "dog". Message checker 104 can also provide a suggestion, for example, checking whether the attachment of the image is a correct one.

In one or more embodiments, the non-textual part may include an emoji. Content context extraction module 106 may identify the content context of the emoji by identifying entities within the emoji. For example, when the emoji is an emoji of a hamburger, content context extraction module 106 may identify the content context of the emoji as a hamburger. In this example, when the user types "getting pizza for dinner", intent and entity extraction module 108 can identify the intent and entity of the textual part of the message meaning getting a pizza. Message checker 104 performs the analysis and identifies a mismatch between the hamburger emoji and the message typed by the user meaning a pizza. In step 210, message checker 104 can flag the emoji and the message. Message checker 104 can provide a corrective suggestion for the hamburger emoji with the pizza emoji. Message checker 104 can also provide a suggestion, for example, checking whether the word "pizza" should be "hamburger".

In one or more embodiments, the non-textual part of the message may include an audio file, for example, a song. Content context extraction module 106 may identify the content context of the song, such as the author or identification of the song. For example, when the user is trying to write a message telling a friend that the user really likes a song named "Great Song" by Bob Smith and attaching the song, the user types "I really like 'Great Song' by Bob Smith". However, the user attaches the song "Happy Day" by John Doe. Content context extraction module 106 can identify the content context of the attached audio file as the song "Happy Day" by John Doe. However, intent and entity extraction module 108 identifies the intent and entity of the textual part of the message meaning the song named "Great Song" by Bob Smith. Message checker 104 performs the analysis and identifies a mismatch between "Happy Day" by John Doe in the attached audio file and "Great Song" by Bob Smith in the typed message. In step 210, message checker 104 can flag the attached audio file and the message. Message checker 104 can provide a suggestion replacing the song "Happy Day" by John Doe with the song "Great Song" by Bob Smith. Message checker 104 can also provide a suggestion, for example, checking whether the words "Great Song by Bob Smith" should be "Happy Day by John Doe".

In one or more embodiments, the non-textual part of the message may include information of a location where a device that the user uses to enter a message is located. In an example, the device is computing device 102 or other suitable devices. Content context extraction module 106 may identify the location information from the device based on a global positioning system or other suitable positioning systems or applications. In an example, when a user is trying to write a message explain to a friend where the user is having a dinner, the user types "getting a quick snack at 'Fast Food'". The user with the device is actually at "Quick Restaurant". Content context extraction module 106 can identify the location of "Quick Restaurant" which can, for example, be identified as the nearest location of such a restaurant. Intent and entity extraction module 108 may identify the intent and entity of the textual part of the message meaning the location "Fast Food". Message checker 104 performs the analysis and identifies a mismatch of the location information between "Quick Restaurant" and "Fast Food" in the typed message. In step 210, message checker 104 can flag the message indicating the location named "Fast Food" incorrectly. In another example, the user using the device types "getting a quick snack at 'Quick Restaurant' in the 'city south'". The user is actually at "Quick Restaurant" in the "city north". Context extraction module 106 can identify the location of "Quick Restaurant" which is in the "city north". Intent and entity extraction module 108 can identify the intent and entity of the textual part of the message meaning the location in the "city south". Message checker 104 can perform the analysis, identify a mismatch of the location information, and can flag the message indicating that the location message should be written "'Quick Restaurant' in the 'city north'".

In one or more embodiments, the non-textual part may include contact information associated with the user. In an example, the contact information is from contact profiles of the user. In another example, the contact information is from social media profile(s) of the user. Content context extraction module 106 may identify the contact information of the user based on the device that the user enters the message. Message checker 104 may enable the utilization of the local contact list to perform a spell check on proper names and suggest an alternative. The user can disable this feature or have to opt in to have their contact or personal information be obtained. In an example, the user is typing the name of a colleague "John Cream", however, the user inadvertently misspells it as "Joe Cream". In step 210, message checker 104 may recognize the context of "John Cream", identify a mismatch and suggest an alternative based on the contact list of the user. The identification of the misspelling may be based on the context from the contact list of the user.

In one or more embodiments, the non-textual part of a message may include any combination of images, emojis, audio files, locations, videos, spoken words, location settings, keyboard settings, global positioning system information, microphone information, camera information, accelerometer information, temperature information, user contact profiles, and other suitable attachments, device contexts, recipient contexts. Content context extraction module 106 may identify the content context of each component or combination of the components in the non-textual part of the message. Intent and entity extraction module 108 may identify intents and entities of the textual part of the message. Message checker 104 may perform an analysis based on the content contexts of the non-textual part and the intents and entities of the textual part to identify any potential mismatch. In step 210, message checker 104 provides suggestions for the potential mismatches. For example, message checker 104 may highlight the mismatched message. Message checker 104 may suggest alternatives or corrections for the mismatched message.

Figure 3:
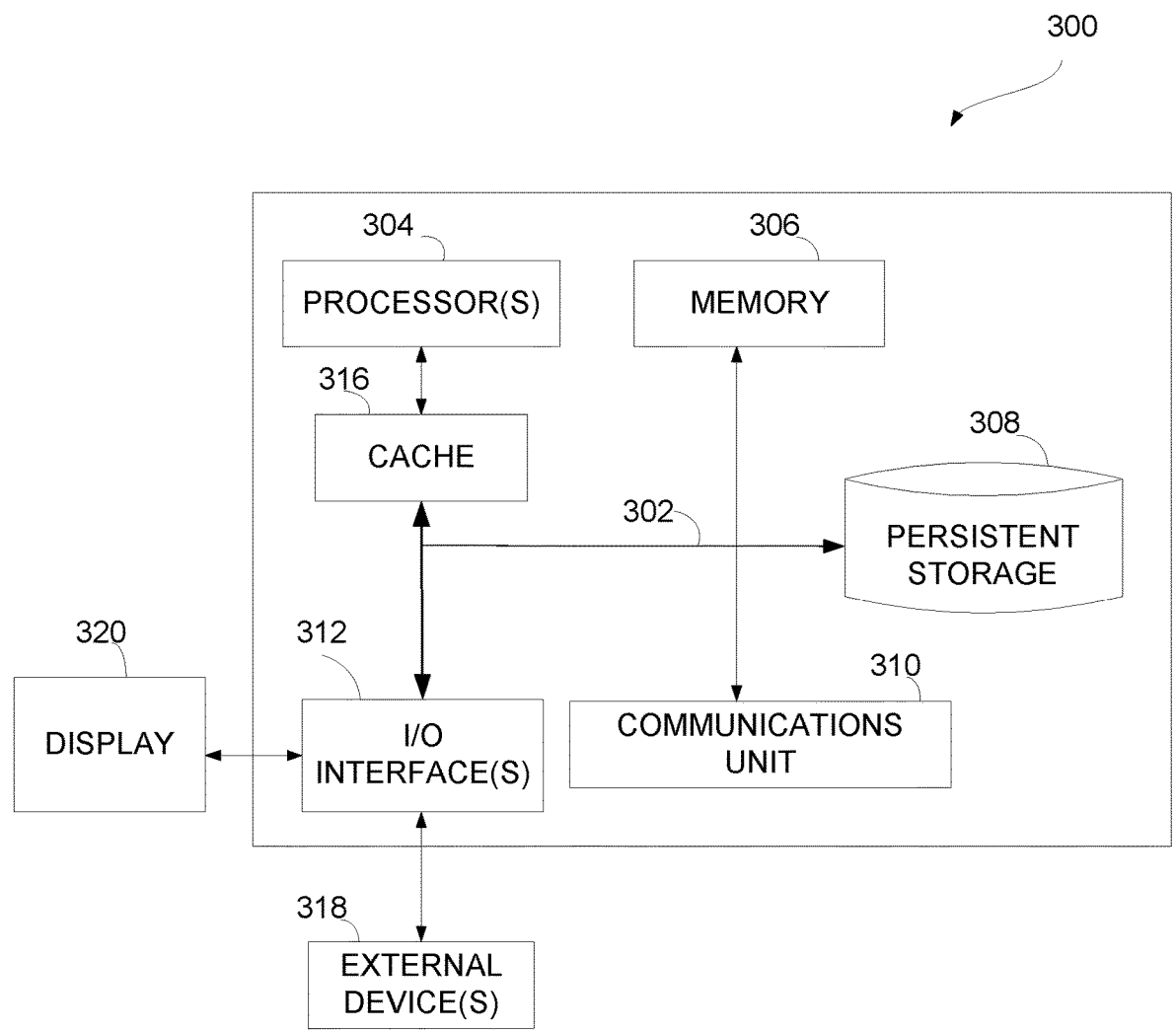
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Message checker 104, content context extraction module 106, and intent and entity extraction module 108 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Message checker 104, content context extraction module 106, and intent and entity extraction module 108 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., message checker 104, content context extraction module 106, and intent and entity extraction module 108 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
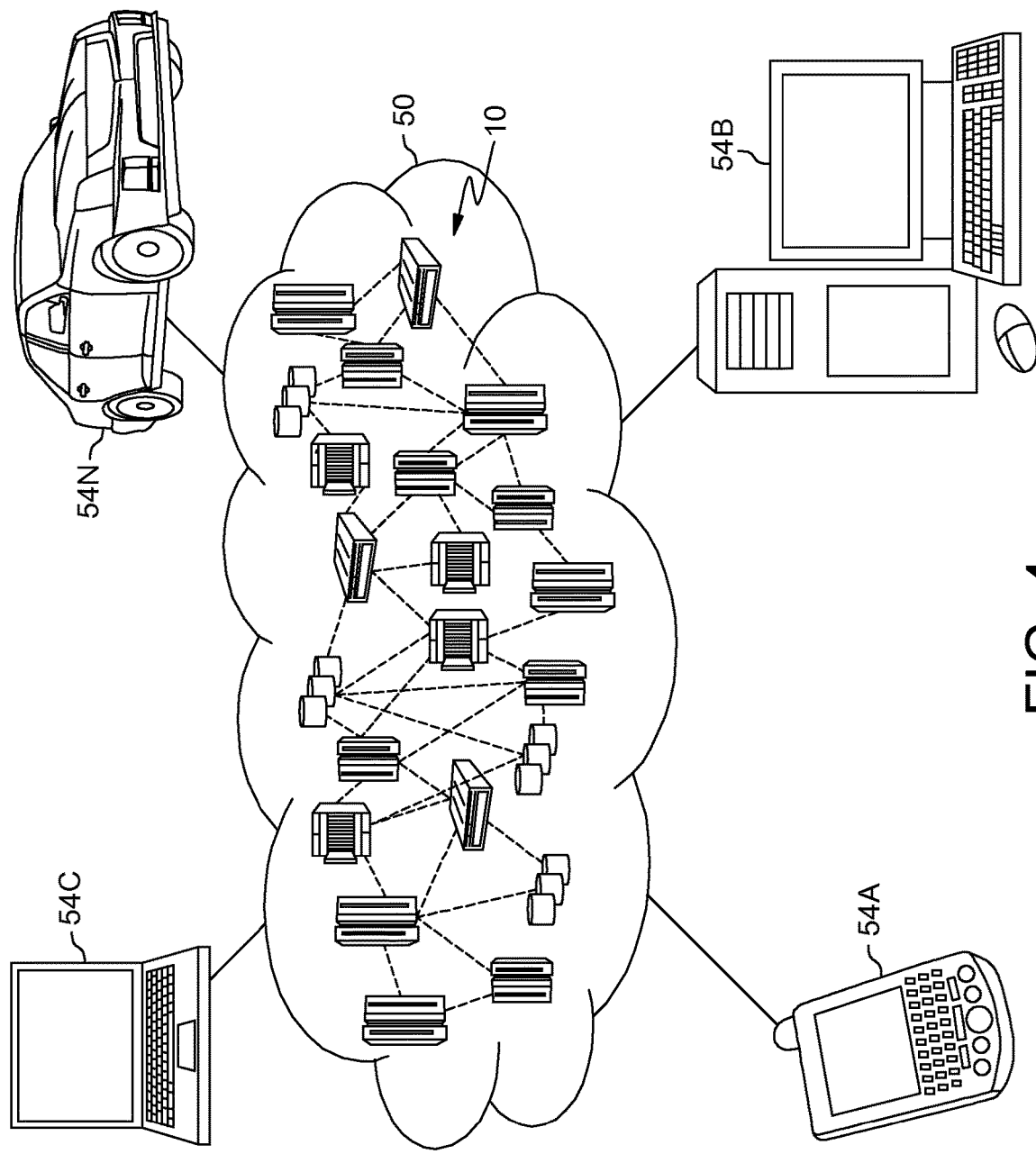
FIG. 4 depicts an embodiment of a cloud computing environment in accordance with the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
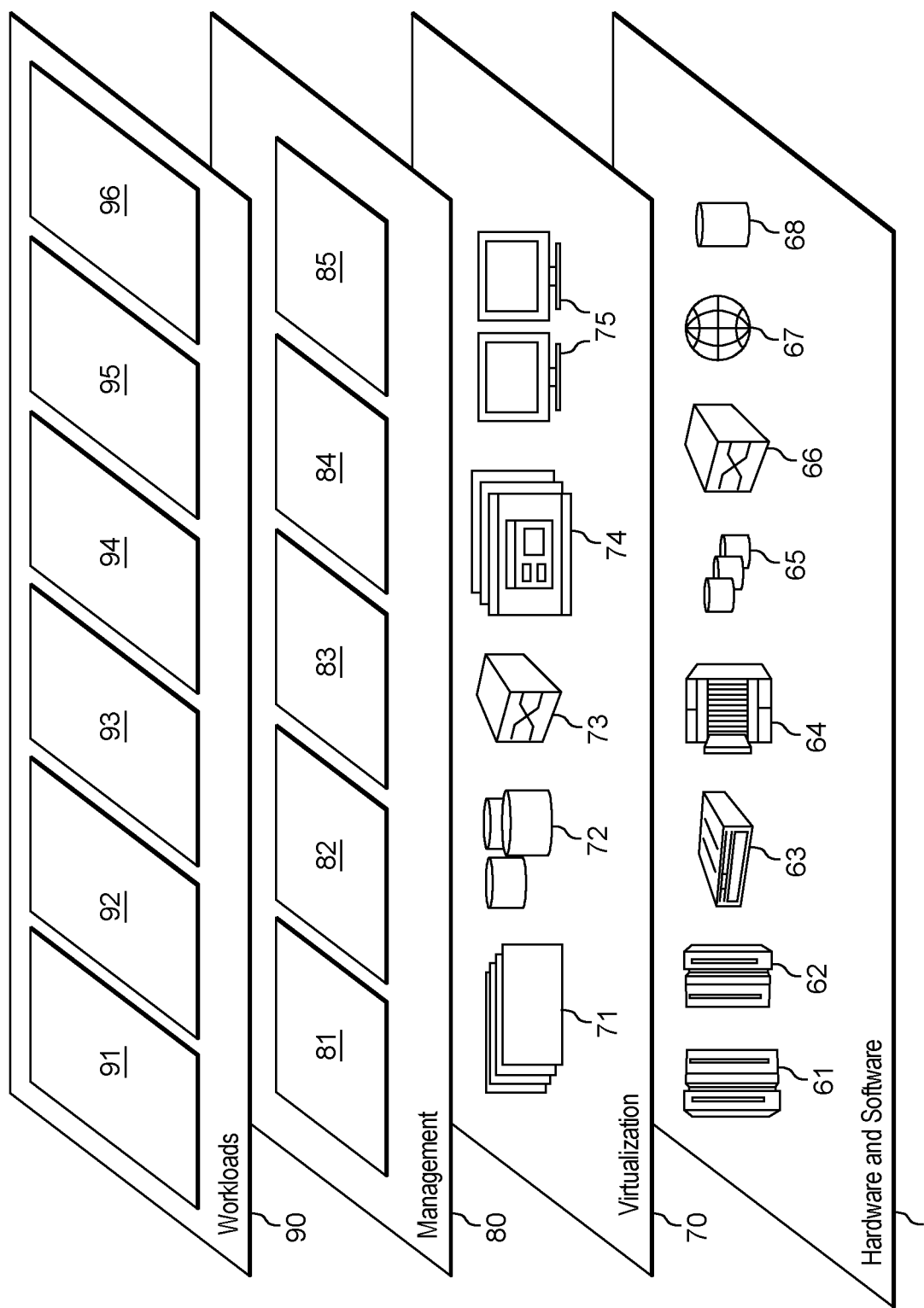
FIG. 5 depicts an embodiment of abstraction model layers of a cloud computing environment, in accordance with the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, message checker 104, content context extraction module 106, and or intent and entity extraction module 108 as described above with respect to content context aware message intent check environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
processing, by one or more processors, a message, the message including a non-textual part and a textual part;
identifying, by one or more processors, a content context of the non-textual part of the message, wherein the content context is an identification of music by analyzing a melody of the music;
identifying, by one or more processors, an intent and entity of the textual part of the message;
determining, by one or more processors, a potential mismatch between the content context of the non-textual part and the intent and entity of the textual part by:
comparing a first meaning of the content context of the non-textual part to a second meaning of the intent and entity of the textual part,
identifying a first noun from the textual part, and
comparing the first noun to a second noun extracted from the content context of the non-textual part; and
providing, by one or more processors, a suggested replacement for the potential mismatch.

2. The computer-implemented method of claim 1, wherein the content context is an entity extracted from an image using image recognition techniques.

3. The computer-implemented method of claim 1, wherein the content context is an emoji meaning extracted from the emoji.

4. The computer-implemented method of claim 1, wherein the content context is an audio identification extracted from an audio file.

5. The computer-implemented method of claim 1, wherein the content context is location information based on a device being utilized to enter the message.

6. The computer-implemented method of claim 1, wherein the content context is a contact name based on a contact profile of a user who creates the message.

7. The computer-implemented method of claim 1, wherein identifying the intent and entity of the textual part of the message includes applying a natural language processing technique to identify the intent and entity.

8. A computer program product comprising:
one or more computer readable storage media and program instructions stored on the one or more computer readable storage media, the program instructions comprising:
program instructions to process a message, the message including a non-textual part and a textual part;
program instructions to identify a content context of the non-textual part of the message, wherein the content context is an identification of music by analyzing a melody of the music;

program instructions to identify an intent and entity of the textual part of the message;

program instructions to determine a potential mismatch between the content context of the non-textual part and the intent and entity of the textual part by:

comparing a first meaning of the content context of the non-textual part to a second meaning of the intent and entity of the textual part, identifying a first noun from the textual part, and comparing the first noun to a second noun extracted from the content context of the non-textual part; and program instructions to provide a suggested replacement for the potential mismatch.

9. The computer program product of claim 8, wherein the content context is an entity extracted from an image using image recognition techniques.

10. The computer program product of claim 8, wherein the content context is an emoji meaning extracted from the emoji.

11. The computer program product of claim 8, wherein the content context is an audio identification extracted from an audio file.

12. The computer program product of claim 8, wherein the content context is location information based on a device being utilized to enter the message.

13. The computer program product of claim 8, wherein the content context is a contact name based on a contact profile of a user who creates the message.

14. The computer program product of claim 8, wherein program instructions to identify the intent and entity of the textual part of the message includes program instructions to apply a natural language processing technique to identify the intent and entity.

15. A computer system comprising:

one or more computer processors, one or more computer readable storage media, and program instructions stored on the one or more computer readable storage media for execution by at least one of the one or more computer processors, the program instructions comprising:

program instructions to process a message, the message including a non-textual part and a textual part;

program instructions to identify a content context of the non-textual part of the message, wherein the content context is an identification of music by analyzing a melody of the music;

program instructions to identify intents and entities of the textual part of the message;

program instructions to determine a potential mismatch between the content context of the non-textual part and the intent and entity of the textual part by:

comparing a first meaning of the content context of the non-textual part to a second meaning of the intent and entity of the textual part, identifying a first noun from the textual part, and comparing the first noun to a second noun extracted from the content context of the non-textual part; and program instructions to provide a suggested replacement for the potential mismatch.

16. The computer system of claim 15, wherein the content context is an entity extracted from an image using image recognition techniques.

17. The computer system of claim 15, wherein the content context is an emoji meaning extracted from the emoji.

18. The computer system of claim 15, wherein the content context is an audio identification extracted from an audio file.

19. The computer system of claim 15, wherein the content context is location information based on a device being utilized to enter the message.

20. The computer system of claim 15, wherein program instructions to identify the intent and entity of the textual part of the message includes program instructions to apply a natural language processing technique to identify the intent and entity.

\* \* \* \* \*